Aug. 19, 1952     L. C. HUFF     2,607,662
STRIPPER FOR SUBDIVIDED CATALYST PARTICLES
Filed Jan. 30, 1946
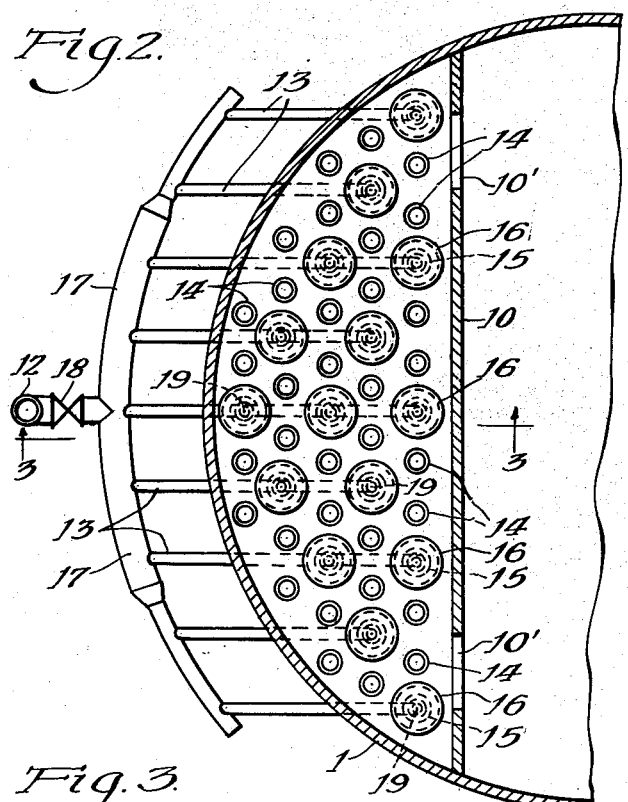
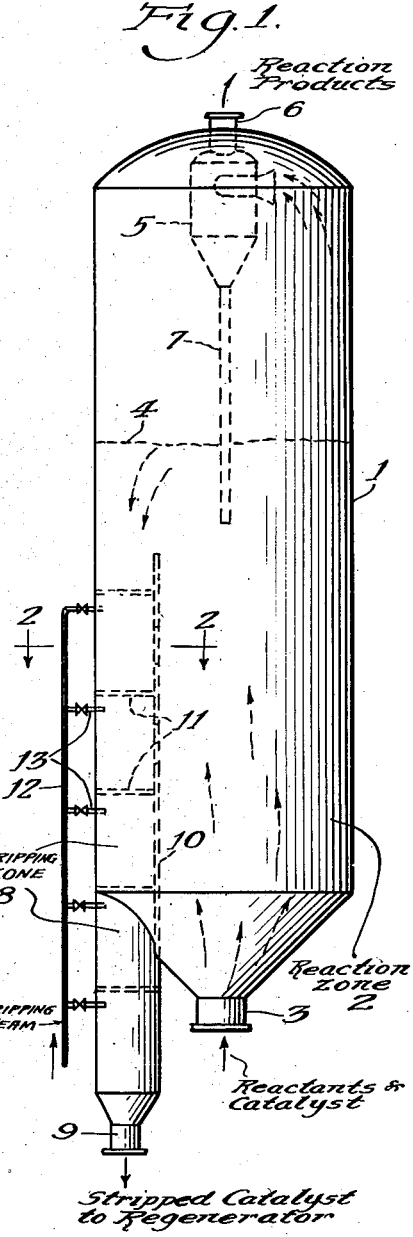
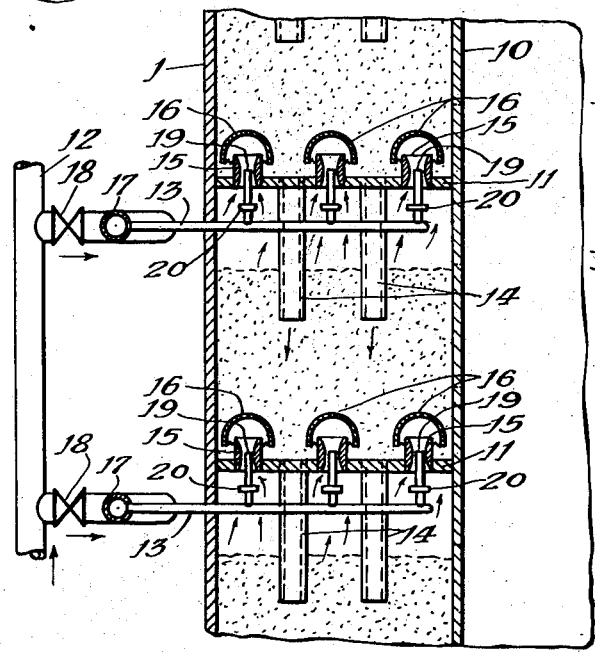
Inventor:
Lyman C. Huff
By: Maynard P. Venema
Attorney Patented Aug. 19, 1952

2,607,662

UNITED STATES PATENT OFFICE 2,607,662

STRIPPER FOR SUBDIVIDED CATALYST PARTICLES

Lyman C. Huff, Evanston, Ill., assignor to Universal Oil Products Company, Chicago, Ill., a corporation of Delaware Application January 30, 1946, Serial No. 644,402

10 Claims. (Cl. 23—288)

This invention relates to an improved apparatus for stripping adsorbed and occluded volatile matter from small subdivided particles.

The principal object of the invention is to provide an improved stripping or contact chamber, wherein countercurrent flow of small solid particles and a fluid medium is employed, such that positive equalized contact is obtained between the two across the entire chamber.

For instance, in a fluid catalytic conversion unit it is desirable to strip contaminated catalyst particles after their contact with the reactants in the reaction zone and prior to their regeneration in an oxidizing zone. The removal of volatile hydrocarbonaceous material from the particles reduces the load on the regeneration system as well as lessening the possibility of excessive temperatures during regeneration and the resultant damage to the catalyst itself.

In the operation of the usual fluidized type of catalyst conversion unit, a dense bed of subdivided catalyst particles is maintained within a reaction zone in a state of hindered settling by a continuous stream of vaporous or gaseous reactants which contact the catalyst particles. A stream of contaminated catalyst, upon which deleterious heavy hydrocarbonaceous products are deposited, is continuously withdrawn from the fluid bed in the reaction zone to a regenerating zone wherein the contaminants are removed to restore the catalytic activity of the particles. The particles in the regenerating zone are maintained in a fluidized state of hindered settling by the continuous stream of oxidizing gas which affects burning and removal of the deleterious carbonaceous material on the particles. In a normal operation of the unit, a light catalyst phase exists above the dense phase bed in both the reaction and regenerating zones. The reaction products are separated from the catalyst in this light phase region of the reaction zone and discharged therefrom to flow through suitable fractionation or treating equipment. Flue gases and combustion products are separated from the catalyst in the light phase region of the regenerating zone and are discharged therefrom to the atmosphere, either directly or through suitable heat recovery apparatus.

Contaminated catalyst particles which are withdrawn from the reaction zone will, of course, be suspended in hydrocarbon gases or vapors unless some gaseous medium, such as a stripping gas, displaces them. As previously noted, it is very desirable to displace the hydrocarbon gas as a suspension medium, as well as effect purging of the catalyst particles of any adsorbed volatile material, in order to aid the operation of the regeneration system. The stripping medium may be steam, flue gas, or other relatively inert noncombustible gaseous material which can be mixed with the reaction products without adversely affecting their quality or which can be easily separated therefrom.

The improved apparatus of the present invention utilizes a modified bubble-cap type of contacting deck or distributing plate which may be placed at spaced levels within an elongated stripping chamber. Each deck is provided with a plurality of vapor risers, each having a bubble-cap or deflecting plate positioned a short distance above, and a plurality of open downpipes which pass catalyst from one level to the next lower level. In addition, equalized streams of stripping gas are conducted to and discharged upwardly within each of the vapor risers by means of a suitable piping system arranged to distribute stripping gas at each vapor riser opening and at the level of each distributing plate.

The principal advantage of this improved stripping apparatus is that an even and equalized countercurrent flow between catalyst particles and the stripping medium is attained throughout the entire transverse area of the stripping column.

In practice, it has been found that considerable channeling occurs in conventional strippers of the type where the stripping gas is charged at only one or two points at the lower end of the stripping zone. In such strippers, the rising gas will, of course, take the path of least resistance, in passing directly upwardly through the descending column of catalyst particles, and unless very positive control means are provided to prevent zones of high and low catalyst densities, the rising stripping medium will tend to bubble or channel itself upwardly in narrow limited paths. Perforated plates or grids of various types have been employed within the present types of stripping zones; however, with the ordinary type of plate it is possible to have the catalyst particles build up in density to the extent that small piles may form at certain points above the plate and the rising gas will flow upwardly, through only a few of the holes provided at the zones where the catalyst density is the least.

One of the features of this invention resides in discharging stripping fluid through outlets which are uniformly spaced across the horizontal area of the stripping column, with a particular advantage being obtained by discharging through a fixed orifice at each of the outlets. The flow through an orifice is not affected as long as the downstream pressure or back pressure remains below about 58% of the upstream or charge pressure. For example, with stripping fluid supplied at 50 pounds per square inch pressure, the pressure of the downwardly moving catalyst column within the stripping chamber may vary or build up to differentials of 58% of 50, or 29 pounds per square inch pressure without affecting a uniform discharge through each orifice throughout the column. Thus, even though catalyst densities may tend to build up in certain areas of the stripper and increase the pressure above a particular outlet, the variations in densities will never vary more than a few pounds and therefore will not prevent stripping fluid from being discharged equally at all of the outlets.

The accompanying drawing and following description thereof will serve to more clearly illustrate the construction features of the apparatus and its advantages for stripping subdivided particles.

Figure 1 of the drawing is an elevational view of a reaction chamber with an attached stripping section or zone such as may be used in a catalytic conversion process.

Figure 2 is a plan view of one of the distributing decks within the stripping zone as indicated by line 2—2 in Figure 1.

Figure 3 is a sectional elevation view through a portion of a stripping zone as indicated by line 3—3 in Figure 2.

Referring now to Figure 1 of the drawing, a chamber 1 is indicated such as may be employed as a reaction chamber in a fluid catalyst conversion process. Heated catalyst and reactants are charged to the reaction zone 2, within the chamber 1, by way of inlet 3. The reactants and catalyst are contacted in a fluid-like dense phase bed, the top of which is indicated by the broken line 4. The depth of this dense phase bed will of course vary with the quantity of charge, the charge velocity, and average residence time desired in the reactor. The vaporous reaction products and stripping gases are separated from the catalyst particles by means of a centrifugal type separator 5. The vaporous material is discharged from the chamber through outlet 6 and transferred to suitable fractionation and treating equipment, while the separated catalyst is returned to the dense phase bed by dip pipe 7, which is attached to the lower end of the separating chamber 5 and causes the catalyst to be discharged below the top level 4 of the dense phase bed.

Contaminated catalyst is withdrawn through the elongated stripping chamber or section 8, by descending downwardly therethrough and being discharged through outlet 9 to a suitable conduit for transferal to a regenerating system. The stripping chamber 8 may be entirely within chamber 1, entirely outside, or as in the form shown, partially within the reactor 1. A partition plate 10 serves to form an elongated stripping section within the chamber 1, and a plurality of distribution plates or decks 11 are spaced vertically throughout the stripper. Contaminated catalyst is passed to the stripping section 8 from the open upper end of the stripping zone or through slots 10' which may be provided in the plate 10 between the decks 11.

Stripping steam, flue gas, or other gaseous medium is passed to each of the decks 8 by means of riser line 12 and various horizontal distributing lines 13. Thus, in operation the stripping medium is distributed at each deck and will flow upwardly through the countercurrently descending column of contaminated catalyst so that uniform efficient stripping of volatiles on the catalyst is accomplished.

Figure 2 of the drawing shows a somewhat enlarged plan view of one of the distribution decks 11, which extend across the elongated stripping zone 8. A plurality of vertical open passageways or downpipes 14 are spaced throughout the deck, each suspended therefrom to terminate at a point a spaced distance above the next lower distribution plate. Also, spaced across the deck are a plurality of gas riser openings 15, each preferably Venturi-like in shape and constructed to extend slightly above the deck plate. Mounted a short distance above each Venturi-like riser 15 there is a downwardly curving plate or bubble cap 16. The riser line 12 has a header 17 at each deck level and from this header the distributing pipes 13 branch horizontally, in order to enter the stripping chamber and feed a stream of stripping gas at each of the gas riser openings 15. The flow to each of the headers 17 may be controlled by means of adjustable valves 18, and in this manner the amount of stripping at each deck may be individually controlled.

A partial elevational view through the stripping zone, as shown in Figure 3 of the drawing, illustrates the construction of the deck 8 with its riser openings 15, its downpipes 14 and the caps 16. The distributing lines 13 have stub outlet lines 19 projecting upwardly into each of the risers 15, and each of the outlet lines 19 are provided with a fixed orifice 20. The orifices 20 provide a pressure drop in the system and means of equalizing the flow of fresh stripping gas to each of the riser openings.

As previously noted, there is a resultant countercurrent flow within the stripper, the catalyst moves downwardly through the pipes 14 and the stripping medium upwardly through each of the risers 15. The additional gas stream from each outlet 19 serves to insure that stripping gas is passed upwardly through each of the risers, thus the entire cross-sectional area of the zone is maintained in a uniform fluid state and no dense pockets of settled catalyst can accumulate and form on any one deck. The vapor riser openings 15 are Venturi-like in form, in order to provide, in positive manner, an upward gas flow through each opening. The gas stream from each orifice discharging within each riser, will suck or pull vapors from below each deck such that the total stream will strike the lower side of the cap 16 and be distributed outwardly around its lower edge. The caps 16 are preferably serrated or notched on their down-turned edges so that the gas stream is broken before contacting the catalyst.

Also, as previously noted, it is desired to make sure that the vapor stream passing upwardly through each riser is discharged at a pressure which is greater (by the ratio of 1 to .58) than the downward pressure in the chamber at any given gas distributing deck. In operation, the catalyst and vapors will be in a rather dense phase just above each deck 11, while a relatively light phase region will exist just below each deck where the stripping gas and stripped vapors will have very little catalyst entrained and will be distributed upwardly through each of the risers 15. The downpipes 14 are preferably long enough to pass catalyst from above one deck to a level within the dense phase bed above the next lower deck.

The improved stripping column of this invention is particularly useful in connection with the fluidized catalytic cracking of hydrocarbons, however, it may be used in other conversion processes such as hydrogenation, dehydrogenation, desulfurization, etc., and it is not intended to limit the apparatus to catalyst stripping only or to any given operation. The invention can be used as a means of uniformly distributing regenerating gases over the area of a regenerator of a catalytic cracking process, or for distribution of reactant vapors in the reactor of such a process. Also, the stripper need not be limited entirely to the exact details shown, for obviously various structural and construction features may be altered and not change the operation of the apparatus in attaining equalized and efficient contacting.

I claim as my invention:

1. An apparatus of the class described comprising a vertically elongated contact chamber having an inlet and an outlet, vertically spaced, horizontal distributing plates within said chamber and each provided with a plurality of openings spaced substantially uniformly over its horizontal area, a baffled vapor riser extending upwardly from each of said openings, a fluid inlet pipe projecting upwardly through each of said openings and terminating within the associated riser, a plurality of open-ended pipes extending downwardly from each of said plates and terminating a substantial distance above the vapor risers of the next lower plate in the chamber, and means for supplying fluid to said inlet pipes comprising a conduit extending vertically along the outside of said chamber and spaced from the latter, a plurality of headers, one communicating with said conduit at an elevation slightly below that of each of said plates and horizontal distributing pipes connecting each of said headers with the fluid inlet pipes of one of said plates.

2. The apparatus of claim 1 further characterized in that the baffle of each of said risers comprises a distributing cap spaced above the riser.

3. The apparatus of claim 1 further characterized in the provision of a flow restriction orifice in each of said inlet pipes.

4. An apparatus of the class described comprising a vertically elongated contact chamber having an inlet and an outlet, vertically spaced, horizontal distributing plates within said chamber and each provided with a plurality of openings spaced substantially uniformly over its horizontal area, a Venturi-like vapor riser extending upwardly from each of said openings, a vapor distributing cap over each of said risers, a fluid inlet pipe projecting upwardly through each of said openings and terminating within the associated riser, a plurality of open-ended pipes extending downwardly from each of said plates and terminating a substantial distance above the vapor risers of the next lower plate in the chamber, and means for supplying fluid to said inlet pipes comprising a conduit extending vertically along the outside of said chamber and spaced from the latter, a plurality of headers, one communicating with said conduit at an elevation slightly below that of each of said plates and horizontal distributing pipes connecting each of said headers with the fluid inlet pipes of one of said plates.

5. The apparatus of claim 4 further characterized in the provision of a flow restriction orifice in each of said inlet pipes.

6. A distributing deck comprising a horizontal plate provided with a plurality of openings spaced substantially uniformly over its horizontal area, a baffled Venturi-like vapor riser extending upwardly from each of said openings to an elevation above said plate, a fluid inlet pipe projecting upwardly through each of said openings and terminating within the associated riser, a plurality of open-ended pipes extending downwardly from said plate, and means for supplying fluid to said inlet pipes.

7. A distributing deck comprising a horizontal plate provided with a plurality of openings spaced substantially uniformly over its horizontal area, a Venturi-like vapor riser extending upwardly from each of said openings to an elevation above said plate, a gas distributing cap over each of said risers and spaced vertically from said plate, a fluid inlet pipe projecting upwardly through each of said openings and terminating within the associated riser, a plurality of open-ended pipes extending downwardly from said plate, and means for supplying fluid to said inlet pipes.

8. A contacting chamber having a vertically extending partition plate therein forming a reaction section and a stripping section, an inlet for charging reactants to said reaction section, means for recovering solids from vapors leaving the upper portion of said reaction section, an outlet from the lower portion of said stripping section, a plurality of spaced horizontal distribution plates extending transversely across said stripping section, openings in said partition plate between said reaction section and said stripping section, a plurality of gas riser openings in each of said horizontal distribution plates, a fluid inlet pipe extending upwardly into each of said riser openings, a plurality of open-ended pipes extending downwardly from each of said horizontal plates, a cap-like baffle spaced above each of said riser openings, and means for supplying fluid to said inlet pipes.

9. The apparatus of claim 8 further characterized in the provision of a fixed orifice in each of said inlet pipes.

10. The apparatus of claim 8 further characterized in that said gas riser openings are of Venturi-like construction.

LYMAN C. HUFF.

REFERENCES CITED

The following references are of record in the file of this patent:

UNITED STATES PATENTS

| Number | Name | Date |
|---|---|---|
| 1,854,002 | Subkow | Apr. 12, 1932 |
| 2,104,858 | Ferguson | Jan. 11, 1938 |
| 2,367,694 | Snuggs | Jan. 23, 1945 |
| 2,389,133 | Brassert et al. | Nov. 20, 1945 |
| 2,430,333 | Hadden | Nov. 4, 1947 |
| 2,444,990 | Hemminger | July 13, 1948 |
| 2,467,850 | Ogerzaly | Apr. 19, 1949 |
| 2,503,788 | White | Apr. 11, 1950 |